| United States Patent [19] | [11] Patent Number: 4,664,936 |
| Ueno et al. | [45] Date of Patent: May 12, 1987 |

[54] AROMATIC POLYAMIDE FIBER-BASED COMPOSITE PREPREG

[75] Inventors: Susumu Ueno; Shigehiro Hoshida, both of Ibaraki; Hirokazu Nomura, Tokyo, all of Japan

[73] Assignee: Shin-Etsu Chemical Co., Ltd., Tokyo, Japan

[21] Appl. No.: 816,309

[22] Filed: Jan. 6, 1986

[30] Foreign Application Priority Data

Jan. 30, 1985 [JP] Japan ................................. 60-15769
Jan. 30, 1985 [JP] Japan ................................. 60-15770

[51] Int. Cl.$^4$ ............................................. B05D 3/06
[52] U.S. Cl. ....................................... 427/38; 427/40; 427/307; 427/308
[58] Field of Search .................... 427/38, 40, 307, 308

[56] References Cited

U.S. PATENT DOCUMENTS 4,064,030 12/1977 Nakai et al. ...................... 428/421 X
4,400,424 8/1983 Hatada et al. ................... 427/40 X
4,504,349 3/1985 Ueno et al. ....................... 427/40 X

OTHER PUBLICATIONS

M. R. Wertheimer and H. P. Hchreiber, Surface Property Modification of Aromatic Polyamides by Microwave Plasmas, J. Appl. Polym. Sci., 26 2087-96 (1981).

*Primary Examiner*—Thurman K. Page
*Attorney, Agent, or Firm*—Hopgood, Calimafde, Kalil, Blaustein & Judlowe

[57] ABSTRACT

The resin-impregnated composite prepreg based on a fabric material of an aromatic polyamide fiber is prepared by exposing the fabric material to low temperature plasma generated in an atmosphere of an inorganic gas, which is preferably oxygen or an oxygen-containing gaseous mixture, under a pressure of 0.5 to 5 Torr to such an extent that ruggedness of 0.01 to 0.5 $\mu$m is formed on the surface and then impregnating the fabric material with an organic resinous binder. The adhesive bonding strength between the binder and the fiber surface can further be increased when the plasma-treated fabric material is brought into contact with an unsaturated compound polymerizable by free radical polymerization without contacting with air so as to form a graft-polymerized layer on the fiber surface.

4 Claims, No Drawings

AROMATIC POLYAMIDE FIBER-BASED COMPOSITE PREPREG

BACKGROUND OF THE INVENTION

The present invention relates to a composite prepreg for molding composed of a fabric material of aromatic polyamide fibers having been subjected to surface modification and impregnated with an organic resinous binder or, more particularly, to an aromatic polyamide fiber-based composite prepeg capable of giving molded articles having excellent mechanical strengths by virtue of the greatly improved adhesive bonding between the surface of the aromatic polyamide fibers and the organic resinous binder impregnating the fabric material of the aromatic polyamide fibers.

Fabric materials, e.g. cloths, of aromatic polyamide fibers have various excellent and advantageous properties including low density, high strength, high elasticity, heat resistance, flame retardancy and others so that they are highlighted as a heat-resistant base material of various kinds of molding prepregs or molding compounds as impregnated with an organic resinous binder. A problem in such a prepreg is the relatively low adhesive bonding strength between the surface of the aromatic polyamide fibers and the organic resious binder impregnating the fabric material of the fibers so that the articles shaped by molding such a prepreg cannot have a sufficiently high mechanical strength as expected. Accordingly, it is eagerly desired to develop a means for the improvement in this regard.

Various proposals and attempts have been hitherto made to increase the adhesive bonding strength between the surface of aromatic polyamide fibers and an organic resinous binder for the impregnation of the fibers including the chemical treatment, e.g. chemical etching and primer treatment, corona discharge treatment and the like. These methods, however, cannot be sufficiently efficient due to the high chemical stability of the aromatic polyamide fibers.

SUMMARY OF THE INVENTION

An object of the present invention is therefore to provide an aromatic polyamide fiber-based composite prepreg impregnated with an organic resinous binder in which the adhesive bonding strength between the fiber surface and the resinous binder is outstandingly high in comparison with conventional prepregs so that shaped articles molded thereof may have greatly increased mechanical strengths.

Thus, the aromatic polyamide fiber-based composite prepreg of the invention is prepared in a process comprising the steps of:

(i) subjecting a fabric material of aromatic polyamide fibers to a treatment with low temperature plasma generated in an atmosphere of an inorganic gas under a pressure in the range from 0.5 to 5 Torr to such an extent that the surface of the fibers is provided with ruggedness of 0.01 to 0.5 $\mu$m; and (ii) impregnating the fabric material after the low temperature plasma treatment with an organic resinous binder.

Although the method comprising the above described steps (i) and (ii) can give a remarkably increased adhesive bonding strength between the surface of the fibers and the resinous binder, further improved results can be obtained when the low temperature plasma-treated fabric material is subjected to a graft polymerization of an ethylenically unsaturated compound polymerizable by the mechanism of free radical polymerization prior to impregnation with the organic resinous binder by the synergistic effect of the ruggedness on the fiber surface and the surface layer formed by the graft polymerization.

DETAILED DESCRIPTION OF THE PREFERRED EMBODIMENTS

Although aromatic polyamide fibers are chemically very stable and the surface property thereof can hardly be modified by the conventional methods as is mentioned above, it has been discovered that ruggedness can be formed on the fiber surface when a fabric material of the fibers is subjected to a treatment with low temperature plasma generated in an atmosphere of an inorganic gas under specific conditions and the surface ruggedness of 0.01 to 0.5 $\mu$m is very effective to greatly increase the adhesive bonding strength of an organic resinous binder with which the fabric material is subsequently impregnated to give a composite prepreg so that shaped articles molded of the prepreg may have a greatly increased mechanical strength.

As to the conditions for the low temperature plasma treatment, the gaseous atmosphere in which the low temperature plasma is generated should have a pressure in the range from 0.5 to 5 Torr and the gaseous atmosphere should be formed of an inorganic gas or a mixture of inorganic gases of which at least 10% by volume should preferably be oxygen gas in order to better achieve the object of the invention. The pressure limitation of 0.5 to 5 Torr is critical and, when the pressure of the plasma atmosphere is outside this range, no desired surface ruggedness can be formed on the fiber even though low temperature plasma may be generated. When the pressure is below 0.5 Torr, namely, the desired surface ruggendess can hardly be formed or, even if formed, is too fine so that the adhesive bonding strength between the fiber surface and the resinous binder is little improved. When the gaseous pressure of the plasma atmosphere is too high, on the other hand, the electric discharge for the generation of low temperature plasma loses stability with increased consumption of the electric power to cause disadvantages due to the increased heat evolution.

The procedure for the low temperature plasma treatment per se is well known in the art. For example, the fabric material of aromatic polyamide fibers is placed in a plasma chamber which can be evacuated to a low pressure and, while the atmosphere inside the chamber is kept at a predetermined low pressure under continuous flow of an inorganic gas, a high-frequency electric power at a frequency of 10 kHz to 100 MHz is impressed between the electrodes of the plasma chamber so as to generate low temperature plasma inside the chamber to which the fabric material is exposed for a certain length of time. It is of course that the frequency of the electric power supply is not limited to the above mentioned high frequency but low frequencies, microwaves and direct current are also suitable.

It is preferable that the electrodes are installed inside the plasma chamber although the electrodes can be installed outside the plasma chamber or a single high-frequency work coil surrounding the plasma chamber can be used. The electrodes are connected to a high freqnency generator either by capacitive coupling or by inductive coupling. At any rate, it is essential that denaturation is not caused on the surface of the fabric material under treatment by the heat of electric discharge.

The configuration of the electrodes is not particularly limitative and the grounded electrode and the counter or input electrode may be of the same form or may be of different forms from each other including plate-like, ring-like, rod-like and cylindrical electrodes. It is a convenient design that the inner walls of the plasma chamber are made of a metal to serve as the grounded electrode. The electrodes or, in particular, input electrode, are usually made of a metal such as copper, iron, aluminum and the like and the surface of the input electrode should preferably be provided with an insulating coating layer having a dielectric strength of at least 10,000 volts such as a layer of glass, porcelain enamel, ceramic and the like. Rod-like electrodes provided with insulating coating are particularly effective to efficiently generate low temperatue plasma at desired spots.

As to the electric power to be impressed between the electrodes, it is usual that the power is limited within a range in most cases when the object body of the low temperature plasma treatment is an organic material in order to avoid undesirable decomposition or degradation of the material by the heat of electric discharge. When the material under treatment is a fabric of aromatic polyamide fibers, the electric power should preferably be considerably larger than in the case of the treatment of other organic materials in order to obtain more efficient result of the low temperature plasma treatment since the aromatic polyamide fibers have excellent heat resistance. For example, an electric power of 5 kW/m$^2$ of the surface area of the input electrode is preferred.

The inoranic gas to fill the atmosphere inside the plasma chamber is preferably oxygen gas or a gaseous mixture containing at least 10% by volume of oxygen. The inorganic gas to be admixed with oxygen is exemplified by helium, neon, argon, nitrogen, nitrous oxide, nitrogen dioxide, carbon monoxide, carbon dioxide, hydrogen, chlorine, hydrogen chloride, sulfur dioxide, hydrogen sulfide and the like. These inorganic gases can be used either singly or as a combination of two kinds or more according to need. Among the above named inorganic gases, nitrogen is preferred and, consequently, air is used quite satisfactorily as a mixture of oxygen and nitrogen.

The types of the fabric material of the aromatic polyamide fibers are not particularly limitative including yarns, rovings, non-woven fabrics and woven cloths, e.g. plain-woven, satin-woven and twill-woven cloths. After completion of the low temperature plasma treatment, the fabric material is subjected to the procedure of impregnation with an organic resinous binder. The fabric material may be a mixed fabric of the aromatic polyamide fibers with fibers of other types such as carbon fibers, glass fibers and the like. The procedure for the impregnation of the plasma-treated fabric material with an organic resinous binder may be conventional including dipping, brush- or roll-coating, spraying and the like.

Suitable organic resinous binder is exemplified by epoxy resin binders, polyimide resin binders, unsaturated polyester resin binders, phenolic resin binders, polyurethane resin binders, acrylic resin binders, rubbery resin binders, polysulfide resin binders, silicone resin binders, urea-based binders, resorcinol resin binders, polyvinyl acetate-based resin binders and the like.

Prior to the impregnation of the plasma-treated fabric material with an organic resinous binder, it is preferable that the fabric material is treated with a coupling agent having an amino or epoxy group in a molecule in order to further increase the adhesive bonding strength between the surface of the fibers and the organic resinous binder. Suitable coupling agents are so-called carbon-functional organosilane compounds exemplified by 3-aminopropyl trimethoxy silane, 3-ethylenediaminopropyl trimethoxy silane, 3-glycidyloxypropyl trimethoxy silane, 3-glycidyloxypropyl methyl dimethoxy silane and the like. The plasma-treated fabric material is coated with a solution of the coupling agent in water or in an organic solvent in a concentration of a few % or lower followed by drying. It is preferable that the fabric material treated with a coupling agent in the above described manner is thoroughly dried by heating at a temperature of 100° to 150° C. or by keeping in a drying room for some length of time prior to the impregnation with a binder.

It has been unexpectedly discovered that the adhesive bonding strength between the surface of the plasma-treated fabric material and the resinous binder can be remarkably increased when, instead of the above mentioned treatment with a coupling agent, the plasma-treated fabric material is subjected to a graft polymerization of an ethylenically unsaturated compound polymerizable by the mechanism of free radical polymerization prior to the impregnation with a binder. The ethylenically unsaturated compound polymerizable by the mechanism of free radical polymerization includes vinylic monomers and other monomers having ethylenic unsaturation in the molecule. Oligomers of such a monomer can also be used. It is preferable in the invention that the monomer or oligomer has a radical-polymerizable acryloyl or methacryloyl group as well as certain functional groups effective to increase the adhesive bonding strength such as carboxyl, glycidyl, amino, hydroxy and the like in the molecule. Suitable monomers include acrylic acid, methacrylic acid, acrylamide, 3-glycidyloxypropyl acrylate, 3-glycidyloxypropyl methacrylate, 3-glycidyloxypropyl trimethoxy silane, glycidyl methacrylate, N-methylol acrylamide, methyl acrylate, sodium methacrylpropyl sulfonate, 1,3-butylene methacrylate and the like.

The graft polymerization of the above mentioned monomer can readily take place when the fabric material of the aromatic polyamide fibers after the low temperature plasma treatment is, without contacting with the atmospheric air, brought into contact with the monomer or an oligomer thereof by utilizing the active free radicals formed on the fiber surface by the plasma treatment. When the plasma-treated fabric material is contacted with atmospheric air before contacting with the monomer or oligomer, the active free radicals on the fiber surface are destroyed so that the desired graft polymerization can no longer proceed. Accordingly, a convenient way for carrying out the graft polymerization is that the monomer for the formation of a graft-polymerized layer in the form of vapor is introduced into the plasma chamber after completion of the plasma treatment of the fabric material before air is introduced thereinto. Alternatively, the plasma-treated fabric material is dipped in a liquid monomer or oligomer in an atomsphere of an inert gas such as nitrogen.

The graft polymerization can proceed at room temperature but can be accelerated by heating. The length of time for the graft polymerization should be usually in the range from several tens of seconds to several tens of minutes though dependent on the desired thickness of the graft-polymerized layer on the fiber surface. The graft-polymerized layer formed in this manner usually has a thickness in the range from a few nanometers to several thousands of nanometers. It is, however, preferable that the thickness of the graft-polymerized layer should not exceed several hundreds of nanometers since the adhesive bonding strength with the organic resinous binder is rather decreased when the thickness of the graft-polymerized layer is too large.

The amount of the organic resinous binder to impregnate the fabric material after the plasma-treatment and, optionally, the treatment with the coupling agent or by the graft polymerization should be in the range from 20 to 200 parts by weight per 100 parts by weight of the fabric material though dependent on the type of the desired binder-impregnated prepreg of the fabric material. By virtue of the plasma treatment according to the invention, in particular, the aromatic polyamide fibers are imparted with remarkably increased wettability to the resinous binder and the surface area thereof is greatly increased as a result of the ruggedness formed on the surface so that the amount of the resinous binder can be increased by at least 30% in comparison with conventional fabric materials of aromatic polyamide fibers without plasma treatment. Consequently, shaped articles molded of the inventive prepreg are imparted with physical properties increased so much. The resinous binder can be used as such without dilution in the impregnation treatment of the fabric material when the consistency thereof is suitable for such a procedure although it is optional to dilute the resinous binder with an organic solvent according to need. When a solvent is used, the binder-impregnated fabric material should be dried to remove the solvent by heating under conditions not to cause gelation of the resinous binder.

The thus prepared composite prepreg based on aromatic polyamide fibers according to the invention can be shaped into articles by molding with heating under normal pressure or under pressurization. The aromatic polyamide fibers having been subjected to the low temperature plasma treatment are imparted with ruggedness of 0.01 to 0.5 μm on the surface so that the adhesive bonding strength thereof with the organic resinous binder is greatly increased. Accordingly, the shaped article prepared by molding the inventive composite prepreg is excellent in the thermal conductivity, heat resistance, flame retardancy and dimensional stability with full exhibition of the excellent characterisitic inherent to the aromatic polyamide fibers. The adhesive bonding strength between the layers of the fabric material and the organic resinous binder is of course greatly increased so that the shaped article has excellent mechanical properties such as flexural strength, flexural elastic modulus and the like and is useful in the fabrication of various goods such as laminated plates, helmets, tire cords, interior finishing materials of aircrafts, parabolic antennas, sporting goods, e.g. golf club shafts and tennis rackets, and others.

In the following, the present invention is described in more detail by way of examples.

EXAMPLE 1

(Experiments No. 1 to No. 3)

A woven cloth of aromatic polyamide fiber, K-120 (SC-11), a product by Kanebo Co., was placed in a plasma chamber of an apparatus for low temperature plasma treatment and the chamber was evacuated to have a pressure of 1.0 Torr of air. While keeping the atmospheric condition of the reduced pressure as above inside the plasma chamber, a high-frequency electric power of 10 kilowatts at a frequency of 110 kHz was impressed between the electrodes of the plasma chamber to generate low temperature plasma to which the cloth was exposed for 1 minute. Electron-microscopic inspection of the thus plasma-treated cloth indicated that ruggedness of 0.05 to 0.15 μm was formed on the surface of the fibers.

The thus plasma-treated cloth was then soaked with a 50% N-methyl pyrrolidone solution of a polyimide resin (Kelimide 601, a product by Nippon Polyimide Co.) followed by heating at 150° C. for 15 minutes to evaporate the solvent. The prepreg obtained in this manner contained 100% by weight of the resin based on the weight of the unimpregnated cloth as determined after heating of the prepreg at 300° C. for 30 minutes.

Two sheets of the prepreg were laid one on the other and cured by heating at 200° C. with polyimide films sandwiching the prepreg sheets. A test strip of 1 inch wide and 15 cm long taken by cutting the cured laminate was subjected to the measurement of the adhesive bonding strength between layers by peeling at a 90° direction to give a value of 1.1 kg/inch (Experiment No. 1).

In Experiment No. 2, the conditions for the low temperature plasma treatment of the aromatic polyamide cloth were substantially the same as in Experiment No. 1 except that the pressure of the plasma atmosphere was decreased to 0.4 Torr. The thus plasma-treated cloth had no distinct ruggedness on the fiber surface. The thus plasma-treated cloth was impregnated with the polyimide resin and processed into a laminate in the same manner as in Experiment No. 1, of which the adhesive bonding strength between layers was determined to give a value of 0.8 kg/inch.

Experiment No. 3 was undertaken in the same manner as in Experiment No. 1 or No. 2 excepting the omission of the low temperature plasma treatment of the cloth of the aromatic polyamide fibers. The result was that the adhesive bonding strength between layers was only 0.2 kg/inch.

EXAMPLE 2

(Experiments No. 4 and No. 5)

The same woven cloth of aromatic polyamide fibers as used in the preceding example was placed in the plasma chamber which was evacuated to a pressure of 0.01 Torr. Thereafter, a 4:1 by volume gaseous mixture of oxygen and nitrogen was introduced into the chamber to control and maintain the pressure inside the chamber at 1.5 Torr and an electric power of 25 kilowatts at a frequency of 110 kHz was impressed between the electrodes to generate low temperature plasma to which the cloth was exposed for 30 seconds.

The thus plasma-treated cloth was impregnated with the same polyimide resin in the same manner as in Example 1 to prepare a prepreg of which the pick-up of the resin was 90% by weight based on the cloth. Ten sheets of the prepreg were stacked one on the other and press-cured in a press at 200° C. for 1 hour under a pressure of 25 kg/cm$^2$ with copper foils applied to the outermost surfaces. After cooling, the laminate was taken out of the press and subjected to a postcure treatment at 200° C. for 5 hours.

Test pieces of each 1 cm wide and 12 cm long were taken by cutting the center portion of the laminate and the test pieces were subjected to the measurement of the adhesive bonding strength between layers by peeling in a direction of 180° at a pulling velocity of 5 mm/minute to give a result of 1.4 kg/cm.

For comparison, the same procedure as above was undertaken excepting the omission of the low temperature plasma treatment of the cloth to give a result that the adhesive bonding strength between layers was 0.6 kg/cm.

EXAMPLE 3

(Experiments No. 6 and No. 7)

The same woven cloth of aromatic polyamide fiber as used in the preceding examples was placed in the plasma chamber which was evacuated to a pressure of 0.01 Torr. Thereafter, a 2:1 by volume gaseous mixture of oxygen and nitrogen was introduced into the chamber to control and maintain the pressure inside the chamber at 2 Torr and an electric power of 20 kilowatts at a frequency of 110 kHz was impressed between the electrodes to generate low temperature plasma to which the cloth was exposed for 40 seconds.

Separately, an epoxy-based resinous binder solution was prepared by blending 150 parts by weight of Epikote 1045-B-80 (a product by Shell Chemical Co.), 30 parts by weight of Epikote 154 (a product by Shell Chemical Co.), 5 parts by weight of DICY (a product by Toyo Ink Manufacturing Co.), 0.2 part by weight of Imidazole 2E-4MZ (Shikoku Kasei Co.), 40 parts by weight of methyl ethyl ketone, 40 parts by weight of ethylene glycol monomethyl ether and 30 parts by weight of dimethyl formamide. The plasma-treated cloth was soaked with this binder solution and dried by heating at 140° C. for 5 minutes to prepare a prepreg of which the pick-up of the resin was 70% by weight. Ten sheets of the prepreg were stacked one on the other and press-cured into a laminate in a press at 160° C. for 1 hour under a pressure of 30 kg/cm² with copper foils applied to the outermost surfaces. After cooling, the laminate was taken out of the press and subjected to a post-cure treatment at 180° C. for 1 hour.

Measurement of the adhesive bonding strength between layers was undertaken of this laminate in the same manner as in Example 2 to give a value of 1.5 kg/cm.

For comparison, the same procedure as above was repeated excepting the omission of the low temperature plasma treatment of the cloth to give a result that the adhesive bonding strength between layers was 0.8 kg/cm.

EXAMPLE 4

(Experiment No. 8)

The same woven cloth of aromatic polyamide fibers as used in Example 1 was subjected to the low temperature plasma treatment in just the same manner as in Experiment No. 1 of Example 1. After completion of the plasma treatment, the electric power was turned off and vapor of acrylamide was introduced into the plasma chamber so that the plasma-treated cloth was exposed to the acrylamide vapor without contacting with atomspheric air.

The thus treated cloth was examined by the electron microscopy to find that the surface ruggedness was about the same as on the cloth plasma-treated in Experiment No. 1 while the determination of the contact angle of water on the cloth indicated that a graft-polymerized layer of polyacrylamide was formed on the fiber surface.

A two-sheet laminate of the thus obtained sheet was prepared in the same manner as in Experiment No. 1 and the adhesive bonding strength between layers was determined also in the same manner to give a result of 1.4 kg/inch.

EXAMPLE 5

(Experiment No. 9)

The same cloth of aromatic polyamide fibers as used in the preceding examples was subjected to a low temperature plasma treatment under about the same conditions as in Example 2 except that the plasma-supporting gas was a 9:1 by volume gaseous mixture of oxygen and nitrogen under a pressure of 0.8 Torr, the electric power impressed to the electrodes was 15 kilowatts at a frequency of 110 kHz and the plasma treatment was continued for 2 minutes.

After completion of the plasma treatment, the cloth was transferred into a solution of glycidyl methacrylate without being contacted with the atmospheric air and kept in the solution for 30 minutes to form a layer of graft-polymerized glycidyl methacrylate on the surface of the fibers.

The thus treated cloth was soaked with the same polyimide resin solution as used in the preceding examples and heated at 140° C. for 20 minutes to obtain a polyimide resin-impregnated prepreg. The resin pick-up was 100% based on the cloth. A laminate was prepared of 10 sheets of the thus obtained prepreg in the same manner as in Example 2 followed by a post-cure treatment at 200° C. for 1 hour. The adhesive bonding strength between layers of the laminate was 1.6 kg/cm as determined in the same manner as in Example 2.

EXAMPLE 6

(Experiment No. 10)

The same woven cloth of aromatic polyamide fibers as used in the preceding examples was subjected to a low temperature plasma treatment in about the same manner as in Example 3 except that the plasma-supporting gas was a 1:1 by volume mixture of oxygen and nitrogen under a pressure of 1.5 Torr and the plasma treatment was continued for 1 minute.

The plasma-treated cloth was then brought into contact with acrylic acid for 5 minutes without being contacted with the atmospheric air so that a layer of the graft-polymerized acrylic acid was formed on the surface of the fibers.

The thus treated cloth was processed into an epoxy-impregnated prepreg in just the same manner as in Example 3. The pick-up of the epoxy resin in the prepreg was 65% based on the cloth. Ten sheets of the prepreg were molded into a laminate in just the same manner as in Example 3 and subjected to the measurement of the adhesive bonding strength between layers to give a result of 1.6 kg/cm.

What is claimed is:

1. A method for the preparation of a resin-impregnated composite prepreg based on a fabric material of an aromatic polyamide fiber which comprises the steps of:
   (a) exposing the fabric material to low temperature plasma generated in an atmosphere of an inorganic gas under a pressure in the range from 0.5 to 5 Torr to such an extent that ruggedness of 0.01 to 0.5 μm is formed on the surface of the aromatic polyamide fiber;

(b) bringing the thus plasma-treated fabric material into contact with an ethylenically unsaturated compound polymerizable by the mechanism of free radical polymerization so as to cause graft polymerization of the unsaturated compound on to the aromatic polyamide fiber of the fabric material; and (c) impregnating the thus treated fabric material with an organic resinous binder.

2. The method for the preparation of a resin-impregnated composite prepreg as claimed in claim 1 wherein the inorganic gas is oxygen or a gaseous mixture containing at least 10% by volume of oxygen.

3. The method for the preparation of a resin-impregnated composite prepreg as claimed in claim 1 wherein the ethylenically unsaturated compound is a monomeric or oligomeric compound having at least one acryloyl group or methacryloyl group in a molecule.

4. The method for the preparation of a resin-impregnated composite prepreg as claimed in claim 1 wherein the amount of the organic resinous binder is in the range from 20 to 200 parts by weight per 100 parts by weight of the fabric material.

* * * * *